United States Patent
Watson et al.

(10) Patent No.: US 8,799,446 B2
(45) Date of Patent: Aug. 5, 2014

(54) SERVICE RESILIENCY WITHIN ON-PREMISE PRODUCTS

(75) Inventors: Eric B. Watson, Redmond, WA (US); Lingan Satkunanathan, Kirkland, WA (US); Bjorn B. Levidow, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1420 days.

(21) Appl. No.: 11/506,510

(22) Filed: Aug. 18, 2006

(65) Prior Publication Data

US 2008/0046552 A1    Feb. 21, 2008

(51) Int. Cl.
  *G06F 15/173* (2006.01)
  *G06F 15/16* (2006.01)
  *G06F 11/00* (2006.01)

(52) U.S. Cl.
  USPC ............ 709/224; 709/219; 714/4.1; 714/4.11

(58) Field of Classification Search
  USPC .................. 709/224, 223, 219; 714/4.1, 4.11
  See application file for complete search history.

(56) References Cited

U.S. PATENT DOCUMENTS

| | | | | |
|---|---|---|---|---|
| 6,134,673 | A * | 10/2000 | Chrabaszcz | 714/13 |
| 6,578,158 | B1 | 6/2003 | Deitz et al. | |
| 6,633,230 | B2 * | 10/2003 | Grandin et al. | 340/506 |
| 7,069,317 | B1 * | 6/2006 | Colrain et al. | 709/224 |
| 7,298,867 | B2 * | 11/2007 | Slaski | 382/103 |
| 7,451,209 | B1 * | 11/2008 | Schieber et al. | 709/224 |
| 7,818,630 | B2 * | 10/2010 | Hendrickson et al. | 714/47.1 |
| 2002/0133735 | A1 * | 9/2002 | McKean et al. | 714/5 |
| 2003/0036897 | A1 * | 2/2003 | Flores et al. | 703/22 |
| 2005/0066221 | A1 * | 3/2005 | Benhamou et al. | 714/5 |
| 2005/0097394 | A1 * | 5/2005 | Wang et al. | 714/11 |
| 2006/0015645 | A1 * | 1/2006 | Ocko et al. | 709/238 |
| 2006/0190766 | A1 * | 8/2006 | Adler et al. | 714/13 |
| 2007/0168581 | A1 * | 7/2007 | Klein et al. | 710/31 |
| 2007/0226333 | A1 * | 9/2007 | Morich et al. | 709/224 |
| 2007/0244937 | A1 * | 10/2007 | Flynn et al. | 707/204 |

FOREIGN PATENT DOCUMENTS

| | | |
|---|---|---|
| EP | 01014647 A2 | 6/2000 |
| JP | 10116206 A | 5/1998 |
| WO | 2004010653 A1 | 1/2004 |

OTHER PUBLICATIONS

International Search Report, PCT/US2007/016253, Nov. 30, 2007, pp. 1-7.

* cited by examiner

*Primary Examiner* — Viet Vu
*Assistant Examiner* — Herman Belcher
(74) *Attorney, Agent, or Firm* — Henry Gabryjelski; Kate Drakos; Micky Minhas (57) ABSTRACT

Described is a technology by which a remote network (or local) service is monitored for failure, e.g., by determining whether data corresponding to operation of the service achieves a threshold. When a threshold is achieved that indicates that the service has failed, the service is automatically deactivated for use with a local workload, and the workload switched to use a second service or system having functionality similar to that of the failed service. The second service may be monitored for failure, as may the failed service to determine when it is again operational. In this manner, a remote primary service may have another local or remote secondary service/system automatically substituted for it when it fails, and be restored for use when it returns to acceptable operation.

20 Claims, 5 Drawing Sheets

SERVICE RESILIENCY WITHIN ON-PREMISE PRODUCTS

BACKGROUND

Computing in general is becoming more service oriented. In general, services delivered through the Internet to enterprises or consumers perform some functionality, such as to provide hosted email services, remote monitoring, backup services and so forth. Typical services interact with a local (on-premise) workload comprising one or more programs and/or other resources.

However, as companies or consumers add web-based services to their computing environment, or replace existing on premise servers/software with services, managing and troubleshooting functionality problems become much more difficult than when most or all of the functionality was on premise. In general, with Internet services there are multiple additional points of failure, over and above those for on-premise services, that can increase service downtime, and/or cause partial downtime for computer system end users. Some types of network failures such as slow latency or intermittent failures make troubleshooting off-premise services especially difficult, and are particularly hard to manage.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a service is monitored for failure by determining whether data corresponding to operation of the service achieves a failure threshold. When a threshold is achieved that indicates that the service has failed, actions are taken, including taking a first action that deactivates the failed service for use with a workload, and taking a second action that switches the workload to use a second service or system having at least some functionality similar to the functionality of the failed service. The failed service may continue to be monitored to determine when it returns to an adequately operational status, e.g., achieves a fully-operational threshold. The second service also may be monitored for its operational status.

In one example implementation, a monitoring component evaluates data corresponding to an operational state of a first service against criteria corresponding to one or more thresholds. Failover logic coupled to the monitoring component is triggered by the monitoring component when the monitoring component detects a threshold being achieved. When a particular threshold indicates that the first service has failed, the failover logic is triggered to take actions, including a first action that deactivates the first service for use with a workload, and a second action that switches the workload to use a second service or system having at least some similar functionality to that of the first service. The first service and second service may be remote services accessed via the Internet, or in an alternative, the first service may be a local service and the second service a remote service. As another alternative, the first service may be a remote service and the second service or system may be a local service or system.

In this manner, a service can be a primary service, with a secondary service or system as a back up, for example, (although there may be any number of off-premise services and any number of on-premise services that can be switched between). Upon determining that a remote primary service has failed, e.g., by determining that data corresponding to operation of the remote primary service achieved a failure threshold, the remote primary service may be deactivated for use with a workload. A secondary service or system may then be switched for use with the workload. The primary service may be monitored after failure to determine when the primary service is again operational, e.g., based on the primary service achieving an operational threshold. When the primary service has again achieved an operational threshold, the secondary service or system may be deactivated for use with the workload, and the primary service may be switched to again use with the workload.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards monitoring remote (e.g., Internet) services and taking mitigation actions to resolve issues, wherein in general, a remote service executes off-premise while interacting with one or more on-premise workloads in some way. Examples of contemporary services include a hosted email service such as for email forwarding and spam filtering, a service for remote monitoring of an on-premise workload, a remote backup service and so forth, with the number and types of available services increasing rapidly. While typically accessed over the Internet, the service need not necessarily be an Internet service, but may, for example, be part of an enterprise network's intranet or even a local service or system.

With respect to taking some mitigation action in response to detection of a failure of a service, note that the concept of a failure is not limited to a complete failure, but also includes concepts such as slow operation, instability, unreliability and so forth. Note further that the failure may not be a failure of the service itself, but rather may be caused by some intermediary, such as a failed communications link. As such, the term "fail" and its derivatives ("failure," "fails," "failed" and so forth) as used herein with respect to a service includes any type of problem affecting acceptable operation of the service, including a complete outage (e.g., the service or link thereto is down), as well as degraded service, (e.g., slow, unreliable and/or intermittent behavior), regardless of the cause. Notwithstanding, as will be understood, different types of failures are not necessarily handled the same, e.g., different thresholds may exist for different types of failures, and/or different actions (including "failovers") may be taken in response to different types of failures.

In one example implementation, at least some monitoring of the service and failover logic is exemplified herein as being part of an on-premise suite of network-related software programs typically used in an information technology (IT) infrastructure. Examples of programs that may be present within such a suite include an administration console, an email server program, an antivirus and/or spam filtering program, a file server program, and so forth. Other on-premise workloads may be external to the suite. Notwithstanding, it can be readily appreciated that instead of a suite, a standalone program or other entity (e.g., a dedicated device) may include the service monitoring and failover logic, or the mechanism may be part of another program such as an application program or operating system component, and so forth. Essentially, any computing device or combination of devices capable of hosting logic and accessing data may be used for the service monitoring and failover mechanism. Indeed, some or all of the components of the monitoring of the service and failover logic may not necessarily be literally on-premise and/or in one location, but rather can in whole or in part be accessed remotely, such as a service itself, for example.

As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and networking in general.

Figure 1:
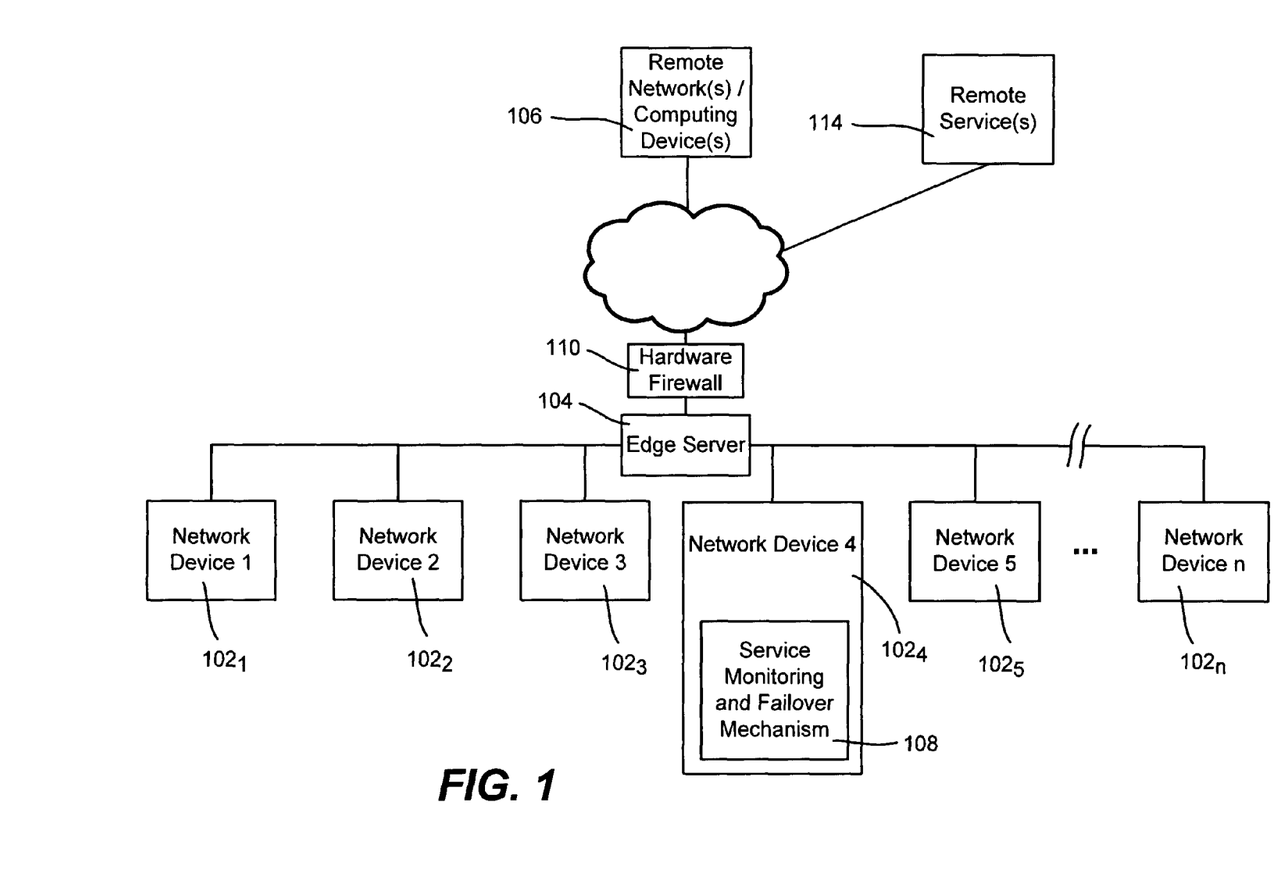
FIG. 1 shows an illustrative example of a general-purpose network computing environment into which various aspects of the present invention may be incorporated.

FIG. 1 shows an example network arrangement for a hypothetical enterprise, in which a number of computing devices $102_1$-$102_n$ are coupled via an edge server 104 to other remote networks and/or computing devices 106, and remote services 114. The computing devices $102_1$-$102_n$ may be any device capable of running code and/or containing logic. Note that while an edge server 104 is shown within this example of FIG. 1, the technology described herein may apply to many other products and configurations, including one in which an edge server may not be present; indeed, as set forth above, the technology described herein may apply to a standalone machine (e.g., the computer 510 of FIG. 5), or a peer-to-peer network. Further, although not shown in FIG. 1, it is understood that various other networking components may be present, e.g., routers, switches, hubs, modems, and other hardware-based firewalls.

One of the computing devices (e.g., $102_4$) is shown as maintaining a service monitoring and failover mechanism 108, comprising logic and (possibly) related data, which as described above need not be entirely "on-premise" in a literal sense. Further, it is understood that even in a configuration in which the service monitoring and failover mechanism 108 is literally "on-premise" within a network, the service monitoring and failover mechanism 108 may be distributed among more than one network device. Thus, for example, the service discovery and configuration mechanism 108 may comprise a program that runs at least in part on the edge server 104; further although not shown as such in the example of FIG. 1, the service discovery and configuration mechanism 108 may be a program that runs entirely on the edge server 104.

Figure 2:
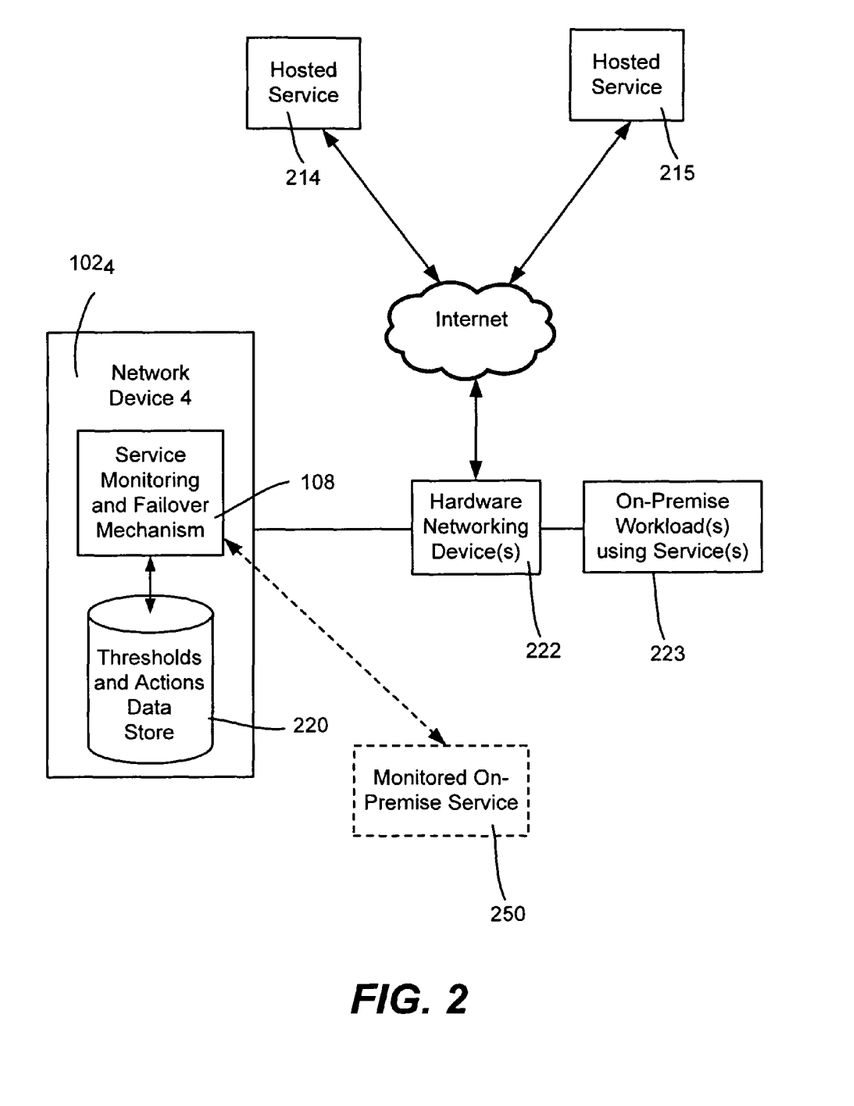
FIG. 2 is a block diagram representing components for service monitoring and failing over a failed service to another service or system.

In one example implementation generally represented in FIG. 2, the service monitoring and failover mechanism 108 monitors one or more hosted Internet services (e.g., two hosted services 214 and 215 are shown, although it is readily appreciated that any practical number is feasible), wherein a hosted service is generally one to which a client (and at least one workload of the client) is coupled and interacting therewith. Note that the mechanism may monitor multiple services, or alternatively there may be multiple instances of the mechanism 108, e.g., one per monitored service or type of service. Further, note that local software may include the local and remote options and/or configuration information needed for the local system to integrate with the remote service. Also shown in FIG. 2 is a networking device 222 and other on-premise functionality, including one or more on-premise workloads 223 (e.g., programs) that are hosting, interacting and/or otherwise using one or both of the hosted services 214 and 215.

Various ways to monitor a service are feasible, and often depend on the type of service. For example, the service monitoring and failover mechanism 108 may monitor the functionality of the hosted service (e.g., the service 214) through one or more protocols (e.g., agreed upon with the remote service), with the service responding to pings and other requests with appropriate data. For example, responsiveness may be measured in this way, as may overall availability per time frame, with averaging or other mathematical techniques used as desired to obtain meaningful samples. Another example way of monitoring is through testing, such as by having a local workload or the like emulate a critical transaction and then check returned data for the expected outcome, including checking for valid data, for example. Yet another way of monitoring is by interfacing with any status monitoring data provided by the service, such as via a service status page and/or other web service that provides availability information; note that this can be somewhat unreliable data, as a service may report its status as normal but an intermediary may be causing problems with the service. Further, on-premise workloads 223 and other entities that use a service may provide status reports or the like that indicate a problem.

To determine a service failure, the service monitoring and failover mechanism 108 includes predefined thresholds, such as maintained in a data store 220. In a typical implementation, the thresholds are user-configurable values, which may be based on default starting values. Thresholds may be different for each service, and there may be different thresholds for different types of failures for a given service. For example, there may be one threshold value for complete outages (e.g., service down), and another value for degraded service (e.g., a slow response/long latency time, intermittent response and so forth). Note that different thresholds may exist for sub-types of failures, e.g., for detecting degraded service operation, there may be a time-based threshold value for detecting slow responses, while for intermittent operation there may be a percentage or similar threshold value, e.g., to evaluate how frequently the service is available. In general, to detect service failures, the monitoring and failover mechanism 108 receives actual monitoring data, compares the actual data (possibly after some mathematical processing as mentioned above) with the corresponding threshold values or values.

If desired, thresholds may be dynamic and/or calculated values, at least to an extent. For example, for any given service, one threshold (or set of thresholds) may apply during normal business hours, with another set applicable on nights and weekends. Other dynamic data may be used as a factor in establishing a threshold. For example, if the entire company's Internet connection is slow and there is no local alternative for a service that is detected as having failed because it is operating slowly, then switching to another Internet service will not be of help, and may cost more; dynamically calculating a latency threshold value based on a measured connection speed factor may adjust the threshold and thus avoid an unhelpful and costly switch.

In general, in the event of a detected failure, the service monitoring and failover mechanism 108 takes one or more mitigation actions to resolve the failure issue or issues. Such mitigation actions may include deactivating the failed service for use by the workload or workloads using it, and possibly switching the workload or workloads to use a substitute service or system, e.g., one having similar functionality to that of the failed service. The failover mechanism 108 includes the ability to transition without loss of continuity of function, or transition with loss of continuity. When transitioning with loss of continuity, the failover mechanism 108 may notify the user of the loss of continuity.

Note that once a service is deemed to have failed, it may continue to be monitored to determine when it is restored to an acceptably operational state. To this end, there may be another threshold value or set of values that are compared against actual data obtained for that service, with the service being considered as having returned to an operational (e.g., fully or otherwise acceptable) functioning status when the operational threshold is met. For example, one or more threshold values may be used to define a stable status, such as in terms of tested functionality along with the length of time the service has remained reliable after a previous failure.

As also represented in FIG. 2, it is feasible to have the service monitoring and failover mechanism 108 (or a similar mechanism) monitor one or more on-premise services, as represented via the dashed block for the monitored on-premise service 250. In this way, a network or system can use an on-premise service as a primary service, and fail it over upon detection of a failure, such as to a web service that acts as the secondary, backup service. In general, there may be any number of off-premise services and any number of on-premise services that can be switched between.

Figure 3:
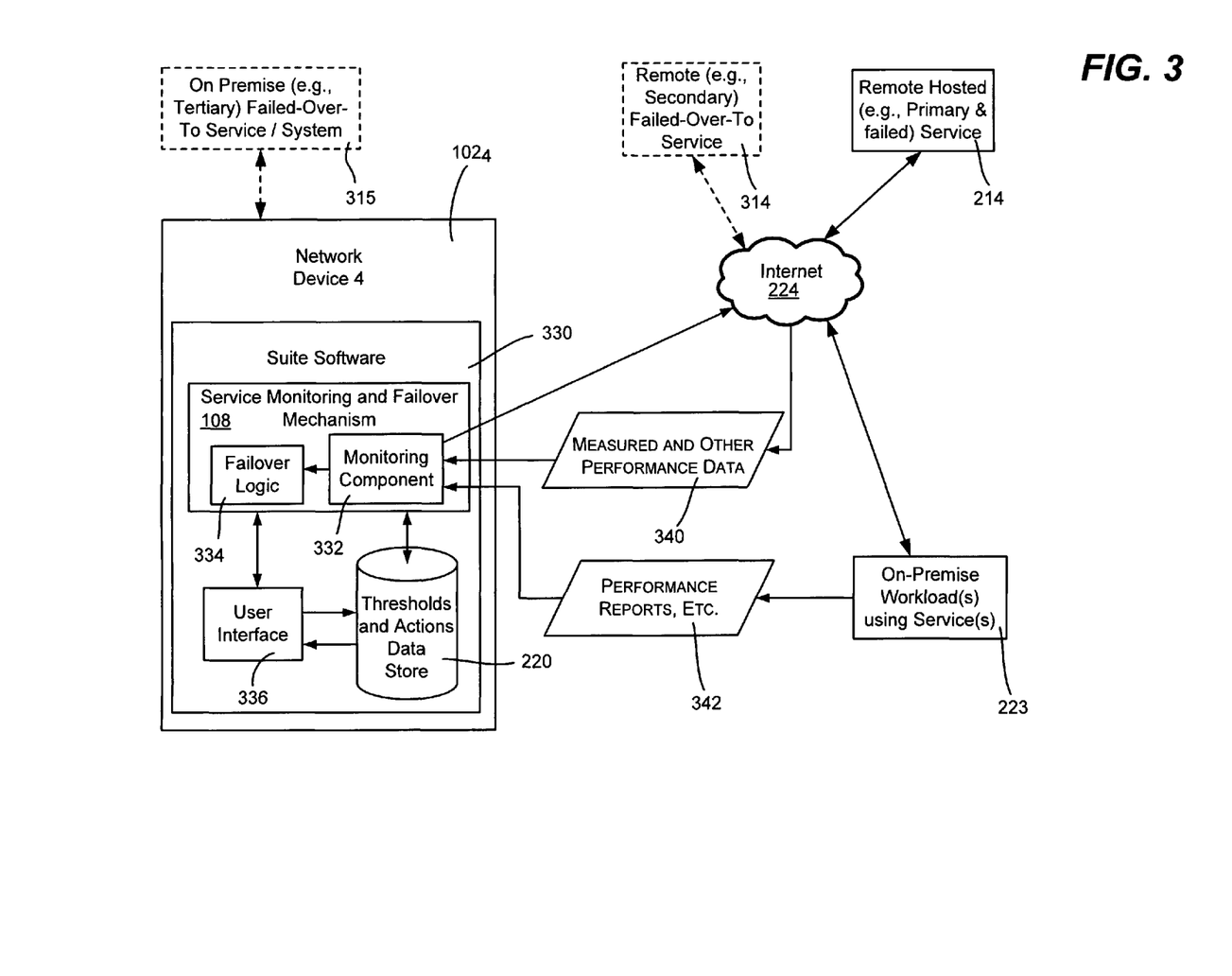
FIG. 3 is a block diagram representing components within an example service monitoring and failover mechanism incorporated into network suite software to fail over a service among a remote service, and/or a local service or system upon failure of a hosted service.

FIG. 3 shows an example implementation in which (at least some of) the service monitoring and failover mechanism 108 is part of an on-premise suite 330 of network-related software programs typically used in an information technology (IT) infrastructure. Examples of programs that may be present within such a suite include an administration console, an email server program, an antivirus and/or spam filtering program, a file server program, and so forth.

As generally represented in FIG. 3, the service monitoring and failover mechanism 108 may include a monitoring component 332 and failover logic 334. A user interface 336 (e.g., incorporated into or otherwise associated with an administration console) allows the administrator/user to set and/or adjust thresholds, and designate one or more actions to take upon each threshold being achieved. Note that a service itself may provide such monitoring criteria and default thresholds, as well as recommended actions to take. Although not shown in FIG. 3, historical data may be kept, such as in the form of failure logs or the like that an administrator or tool may analyze to determine failure types and patterns, such that thresholds may be set and/or tweaked to match a given computing environment's needs.

As mentioned above, example ways to monitor a service may vary, and may depend on the type of service. For example, the monitoring component may run tests/emulations on a monitored service, communicate with the service via one or more communication protocols, and/or interface with status monitoring provided by the service. The results are represented in FIG. 3 via measured and other performance data 340. Further, on-premise programs 223 using the service may provide status reports or the like that indicate a problem with the service (or lack of problems), as represented in FIG. 2 via the performance reports 342. For example, a service may appear to be performing properly with respect to response time and in how it responds to emulated tests, however it would be valuable to report that a service is not be working adequately when given large amounts of data that an actual workload requires be serviced.

If a service fails as evaluated against the threshold data, various actions may be taken by the failover logic 334. For example, the suite software 330 (or other local system) can notify an administrator at various levels. Also, the failover logic 334 can automatically switch the failed service's functionality from the failed service to another service, such as one with equivalent functionality, as represented in FIG. 3 by the secondary (failed-over-to) service 314.

Another alternative is to fail over to a local service having similar functionality. For example, if a remote email antivirus filtering service fails, a local antivirus product may be activated. Yet another alternative is to omit the functionality provided by the failed service, such as when doing so has a limited impact with respect to the overall system. For example, if a remote data backup service fails, anyone wishing to back up data via this service will have to wait until the service is again operational, as no substitute service may be made available to avoid having different backups. Note that while no substitute service is made available, another action may be taken to protect the data, e.g., an action to automatically take a snapshot of a system's data and store that snapshot to a locally safe location. Thus, when a service fails, one or more actions that are unrelated to switching to another service may be performed.

By way of example of monitoring and failover actions, consider a remote email spam filtering service used as a primary filtering service, a secondary (e.g., another provider's) filtering service, and an onsite (e.g., Microsoft®) Exchange) spam filtering program. In this example, a given site is configured to route electronic mail through the primary spam filtering service.

If the primary filtering service (e.g., 214 in FIG. 3) becomes unreliable and is detected as a failure by the monitoring component 332 according to a threshold for unreliability, the failover logic 334 is triggered. For example, the failover logic 334 may be triggered with an event that indicates the service that failed, and the type of failure. Based on this information, the failover logic 334 selects and takes a set of at least one action, such as to automatically deactivate the failed service, and switch the electronic mail from being routed through the primary filtering service (e.g., 214) to being routed through the secondary filtering service (e.g., 314). Assuming the secondary filtering service 314 is operational, similar functionality is restored.

Consider a further example scenario in which the secondary filtering service 314 is detected by the monitoring component 332 as being unstable. The failover logic 334 is again triggered, and this time (e.g., based on different actions for the different service and/or failure type) the logic switches mail to go through a local (e.g., Exchange) spam filtering system 315, whereby similar functionality is again restored. Note that in each case, via the actions maintained for each service/failure type, the main functionality (e.g., routing the mail routing records) is restored. Further, any related functionality such as user provisioning and configuration systems, monitoring/alerting systems, billing systems, and so forth are changed and/or correctly configured to work with the substitute service or system now currently in use.

Consider further that at some point, the primary service becomes reliable and meets the operational threshold criteria (e.g., "fully functioning"), such as being up and working with an acceptable latency for four continuous hours; note that monitoring of the failed service may continue after failure. At such a threshold being achieved, the failover logic 334 is again triggered, this time to restore the failed service, whereby the failover logic 334 takes actions such that the network again routes mail spam filtering back through the primary service, and, for example, disconnects any other failed-over-to services/systems and severs any corresponding ties thereto.

Figure 4:
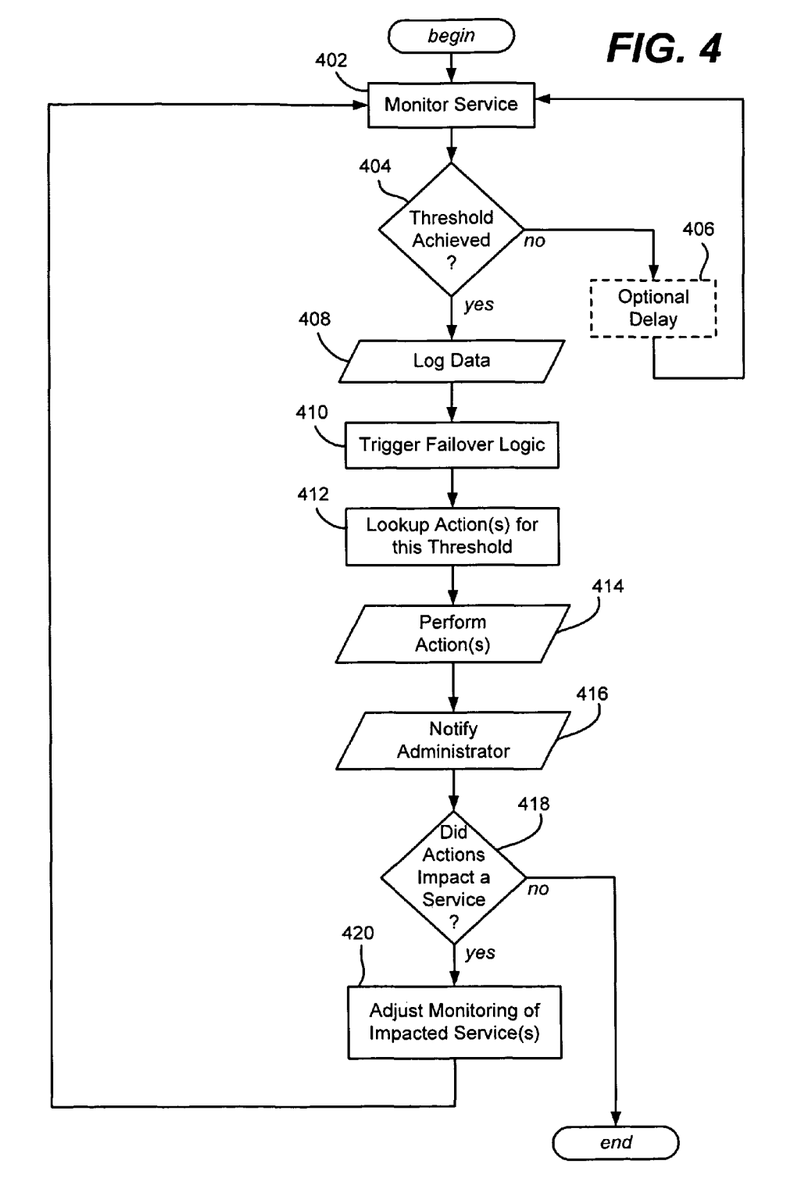
FIG. 4 is a flow diagram showing an example process flow for detecting a failed service and taking one or more actions in response to the detection.

Turning to an explanation of monitoring and failing over in one example implementation, FIG. 4 comprises a flow diagram, beginning at step 402, which represents monitoring a service for a threshold being met. As described above, monitoring generally refers to collecting and analyzing data, running tests and so forth. Note that monitoring may include evaluating data to detect failure of a service, as well as monitoring for a previously failed service to determine if the service is again acceptably operational. Monitoring may be manually started, but alternatively may begin automatically, for example when first coupling a program to a service.

Step 404 represents evaluating the monitoring data to determine if any threshold for that service is achieved. If not, step 404 returns to step 402 to continue monitoring, which may include an optional delay (step 406) if continuous monitoring is not desired.

If there is a threshold met, step 406 branches to step 408, which represents logging some data about the service's failure or recovery. Such logging is optional, but as described above may be useful in analyzing failure or recovery data to set or tweak more desirable thresholds, as well as for other purposes, e.g., to analyze whether a service meets an enterprise's reliability requirements over a long period of time.

With a threshold having been met, the failover logic is triggered at step 410; step 412 represents looking up the set of actions for this threshold, and step 414 represents performing the actions. For failures, actions may include deactivating (decoupling from) the failed service, switching to a secondary service (remote or local), taking no action at all and letting the failed service be used as best as it can, decoupling from the failed service but taking no further action, taking independent actions such as in the above-described snapshot example, and so forth. Note that failure of one service may result in switching to more than one service to take its place; for example, a combined antivirus/spam filtering service may fail, causing a switch to an antivirus service and a separate spam filtering service.

For a threshold that indicates that a previously failed service is now again operational (e.g., a fully functioning threshold is met), actions may include reactivating the service for a workload, deactivating the substituted service or services from use by the workload, taking no action (e.g., awaiting manual instructions), and so forth. Actions that are independent of running services also may be performed, e.g., to discard the data snapshot when a data backup service is restored and remains operational for some length of time.

Step 416 represents notifying the administrator or the like of the threshold being met. Note that step 416 can be considered performing another action, but is shown separately in FIG. 4 to emphasize that actions may be automatically performed without any administrator involvement. Further, note that steps 414 and 416 may be performed in the reverse order, and indeed, the order of many of the example steps in FIG. 4 can be altered without changing the general concept of monitoring a service against one or more thresholds and taking subsequent actions when a monitored service is deemed to have achieved a threshold.

Step 418 represents determining whether at least one of the actions impacted a service, e.g., activated a new one, or deactivated another one. If so, as represented by step 420, any newly activated services may need to be monitored, while any deactivated services may or may not need to be monitored, depending on what the administrator desires. Also, the type of monitoring may change, e.g., a restored service may now be monitored for failure, instead of monitoring for when it can be restored. For example, if a secondary service is activated in view of a primary service's failure, monitoring of both may be desirable, so as to watch the secondary service for failure while watching the primary service for a return to acceptably operational status. Alternatively, if a secondary service is deactivated in view of a primary service's return to fully functional status, monitoring of the primary service for failure is likely desirable, but not monitoring of the secondary service, which was only needed for backup purposes. In most instances, a primary service will continue to be monitored, and thus step 420 will return to step 402. If however the actions deactivate a service, impact no other service, and monitoring of a failed service's return to operational status is not desired, the monitoring process may end (at least with respect to this service) until re-started when the service is reactivated.

Exemplary Operating Environment

Figure 5:
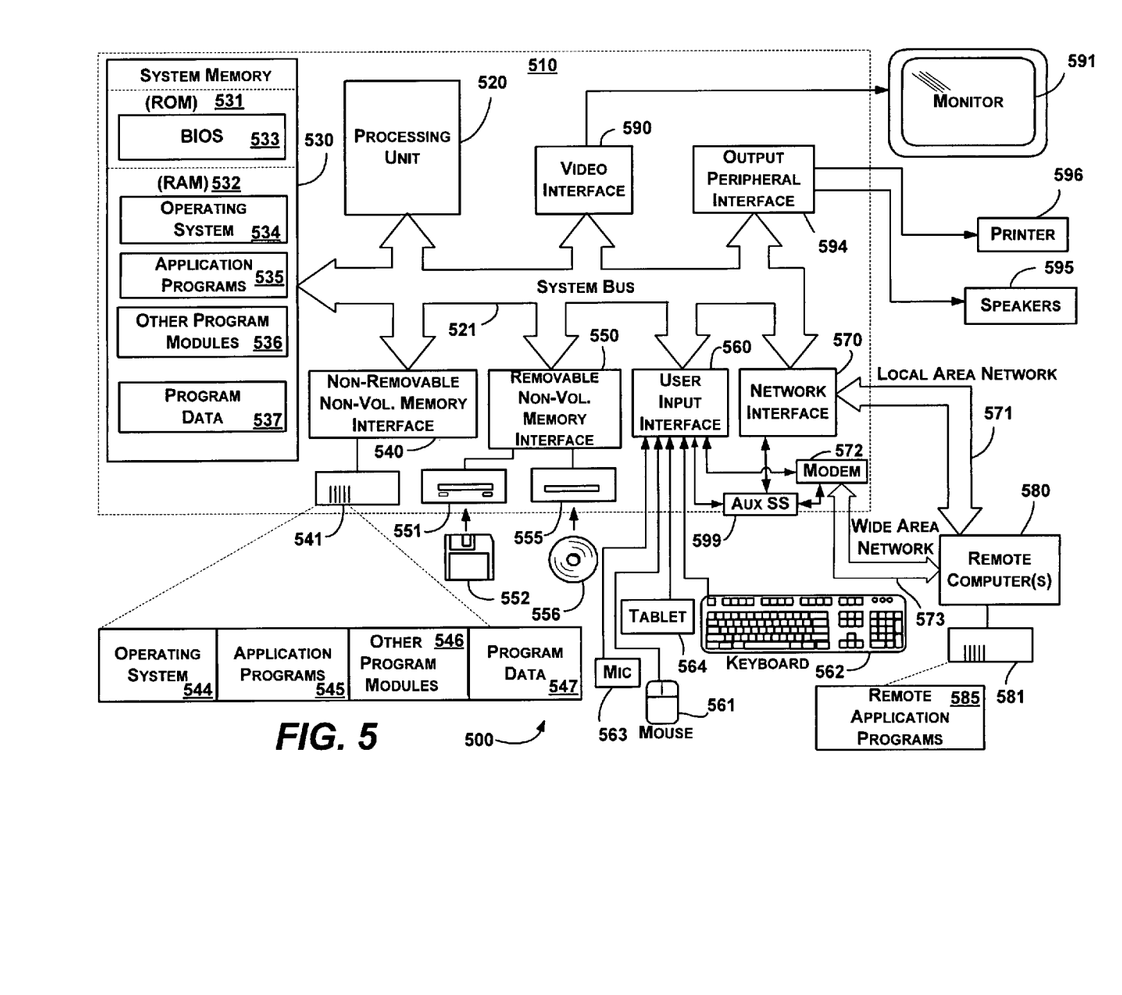
FIG. 5 shows an illustrative example of a general-purpose computing environment including a computer into which various aspects of the present invention may be incorporated.

FIG. 5 illustrates an example of a suitable computing system environment 500 on which the service monitoring and failover mechanism 108 (FIG. 2) may be implemented. The computing system environment 500 is only one example of a suitable computing environment and is not intended to suggest any limitation as to the scope of use or functionality of the invention. Neither should the computing environment 500 be interpreted as having any dependency or requirement relating to any one or combination of components illustrated in the exemplary operating environment 500.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 5, an exemplary system for implementing various aspects of the invention may include a general purpose computing device in the form of a computer 510. Components of the computer 510 may include, but are not limited to, a processing unit 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 510 typically includes a variety of computer-readable media. Computer-readable media can be any available media that can be accessed by the computer 510 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 510. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer information between elements within computer 510, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, application programs 535, other program modules 536 and program data 537.

The computer 510 may also include other removable/non-removable, volatile/nonvolatile computer storage media. By way of example only, FIG. 5 illustrates a hard disk drive 541 that reads from or writes to non-removable, nonvolatile magnetic media, a magnetic disk drive 551 that reads from or writes to a removable, nonvolatile magnetic disk 552, and an optical disk drive 555 that reads from or writes to a removable, nonvolatile optical disk 556 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 541 is typically connected to the system bus 521 through a non-removable memory interface such as interface 540, and magnetic disk drive 551 and optical disk drive 555 are typically connected to the system bus 521 by a removable memory interface, such as interface 550.

The drives and their associated computer storage media, described above and illustrated in FIG. 5, provide storage of computer-readable instructions, data structures, program modules and other data for the computer 510. In FIG. 5, for example, hard disk drive 541 is illustrated as storing operating system 544, application programs 545, other program modules 546 and program data 547. Note that these components can either be the same as or different from operating system 534, application programs 535, other program modules 536, and program data 537. Operating system 544, application programs 545, other program modules 546, and program data 547 are given different numbers herein to illustrate that, at a minimum, they are different copies. A user may enter commands and information into the computer 510 through input devices such as a tablet, or electronic digitizer, 564, a microphone 563, a keyboard 562 and pointing device 561, commonly referred to as mouse, trackball or touch pad. Other input devices not shown in FIG. 5 may include a joystick, game pad, satellite dish, scanner, or the like. These and other input devices are often connected to the processing unit 520 through a user input interface 560 that is coupled to the system bus, but may be connected by other interface and bus structures, such as a parallel port, game port or a universal serial bus (USB). A monitor 591 or other type of display device is also connected to the system bus 521 via an interface, such as a video interface 590. The monitor 591 may also be integrated with a touch-screen panel or the like. Note that the monitor and/or touch screen panel can be physically coupled to a housing in which the computing device 510 is incorporated, such as in a tablet-type personal computer. In addition, computers such as the computing device 510 may also include other peripheral output devices such as speakers 595 and printer 596, which may be connected through an output peripheral interface 594 or the like.

The computer 510 may operate in a networked environment using logical connections to one or more remote computers, such as a remote computer 580. The remote computer 580 may be a personal computer, a server, a router, a network PC, a peer device or other common network node, and typically includes many or all of the elements described above relative to the computer 510, although only a memory storage device 581 has been illustrated in FIG. 5. The logical connections depicted in FIG. 5 include one ore more local area networks (LAN) 571 and one or more wide area networks (WAN) 573, but may also include other networks. Such networking environments are commonplace in offices, enterprise-wide computer networks, intranets and the Internet.

When used in a LAN networking environment, the computer 510 is connected to the LAN 571 through a network interface or adapter 570. When used in a WAN networking environment, the computer 510 typically includes a modem 572 or other means for establishing communications over the WAN 573, such as the Internet. The modem 572, which may be internal or external, may be connected to the system bus 521 via the user input interface 560 or other appropriate mechanism. A wireless networking component 574 such as comprising an interface and antenna may be coupled through a suitable device such as an access point or peer computer to a WAN or LAN. In a networked environment, program modules depicted relative to the computer 510, or portions thereof, may be stored in the remote memory storage device.

By way of example, and not limitation, FIG. 5 illustrates remote application programs 585 as residing on memory device 581. It may be appreciated that the network connections shown are exemplary and other means of establishing a communications link between the computers may be used.

An auxiliary subsystem 599 (e.g., for auxiliary display of content) may be connected via the user interface 560 to allow data such as program content, system status and event notifications to be provided to the user, even if the main portions of the computer system are in a low power state. The auxiliary subsystem 599 may be connected to the modem 572 and/or network interface 570 to allow communication between these systems while the main processing unit 520 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for providing service resiliency, comprising:
    measuring a first response time of a first service to a first ping from a first provider;
    comparing the first response time to a first threshold;
    triggering a first failover logic action when the first response time exceeds the first threshold;
    measuring a network speed of a network associated with the first provider;
    adjusting the first threshold based upon the network speed to generate a second threshold;
    measuring a second response time of the first service to a second ping from the first provider;
    comparing the second response time to the second threshold; and
    triggering a second failover logic action when the second response time exceeds the second threshold, at least some of the method implemented at least in part via one or more processing units.

2. The method of claim 1, at least one of the triggering a first failover logic action or the triggering a second failover logic action comprising:
    initializing a transfer of a function of the first service to a second service.

3. The method of claim 2, the first service being remote relative to the first provider and the second service being local relative to the first provider.

4. The method of claim 1, at least one of the triggering a first failover logic action or the triggering a second failover logic action comprising:
    initializing a transfer of an antivirus functionality from the first service to a second service, the first service comprising a remote antivirus service and the second service comprising a local antivirus product.

5. The method of claim 1, at least one of the triggering a first failover logic action or the triggering a second failover logic action comprising:
    capturing a snapshot of data of a system; and
    storing the snapshot in a location that is local relative to the first provider.

6. The method of claim 1, at least one of the triggering a first failover logic action or the triggering a second failover logic action comprising:
    deactivating the first service.

7. The method of claim 1, at least one of the triggering a first failover logic action or the triggering a second failover logic action comprising:
    activating a second service, the second service local to the first provider and the first service remote to the first provider.

8. The method of claim 1, at least one of the triggering a first failover logic action or the triggering a second failover logic action comprising:
    re-routing electronic mail from a first route through the first service to a second route through a second service.

9. The method of claim 1, comprising providing an alert responsive to at least one of the triggering a first failover logic action or the triggering a second failover logic action.

10. The method of claim 1, comprising logging at least one of the first failover logic action or the second failover logic action.

11. A system for providing service resiliency, comprising:
    one or more processing units; and
    memory comprising instructions that when executed by at least some of the one or more processing units perform a method, the method comprising:
        measuring a first response time of a first service to a first ping from a first provider;
        comparing the first response time to a first threshold;
        triggering a first failover logic action when the first response time exceeds the first threshold;
        measuring a network speed of a network associated with the first provider;
        adjusting the first threshold based upon the network speed to generate a second threshold;
        measuring a second response time of the first service to a second ping from the first provider;
        comparing the second response time to the second threshold; and
        triggering a second failover logic action when the second response time exceeds the second threshold.

12. The system of claim 11, at least one of the triggering a first failover logic action or the triggering a second failover logic action comprising:
    initializing a transfer of a function of the first service to a second service.

13. The system of claim 12, the first service being remote relative to the first provider and the second service being local relative to the first provider.

14. The system of claim 11, at least one of the triggering a first failover logic action or the triggering a second failover logic action comprising:
    capturing a snapshot of data of a system; and
    storing the snapshot in a location that is local relative to the first provider.

15. The system of claim 11, at least one of the triggering a first failover logic action or the triggering a second failover logic action comprising:
    deactivating the first service.

16. The system of claim 11, at least one of the triggering a first failover logic action or the triggering a second failover logic action comprising:
    re-routing electronic mail from a first route through the first service to a second route through a second service.

17. A computer-readable storage device comprising computer-executable instructions, which when executed at least in part via a processing unit perform a method, comprising:

measuring a first response time of a first service to a first ping from a first provider;
comparing the first response time to a first threshold;
triggering a first failover logic action when the first response time exceeds the first threshold;
measuring a network speed of a network associated with the first provider;
adjusting the first threshold based upon the network speed to generate a second threshold;
measuring a second response time of the first service to a second ping from the first provider;
comparing the second response time to the second threshold; and
triggering a second failover logic action when the second response time exceeds the second threshold.

18. The computer-readable storage device of claim 17, at least one of the triggering a first failover logic action or the triggering a second failover logic action comprising:

activating a second service, the second service local to the first provider and the first service remote to the first provider.

19. The computer-readable storage device of claim 17, at least one of the triggering a first failover logic action or the triggering a second failover logic action comprising:

initializing a transfer of an antivirus functionality from the first service to a second service, the first service comprising a remote antivirus service and the second service comprising a local antivirus product.

20. The computer-readable storage device of claim 17, at least one of the triggering a first failover logic action or the triggering a second failover logic action comprising:

capturing a snapshot of data of a system; and
storing the snapshot in a location that is local relative to the first provider.

* * * * *